United States Patent [19]

Maeda et al.

[11] Patent Number: 4,651,289
[45] Date of Patent: Mar. 17, 1987

[54] PATTERN RECOGNITION APPARATUS AND METHOD FOR MAKING SAME

[75] Inventors: Kenichi Maeda, Kamakura; Tsuneo Nitta, Yokohama, both of Japan

[73] Assignee: Tokyo Shibaura Denki Kabushiki Kaisha, Kawasaki, Japan

[21] Appl. No.: 460,623

[22] Filed: Jan. 24, 1983

[30] Foreign Application Priority Data

Jan. 29, 1982 [JP] Japan .................................. 57-12794

[51] Int. Cl.$^4$ ............................................... G10L 5/00
[52] U.S. Cl. .................................... 364/513.5; 381/43; 382/15
[58] Field of Search ..................... 381/41, 42, 43, 44, 381/45, 46, 47, 48, 49, 50; 364/513, 513.5; 382/13-15

[56] References Cited

U.S. PATENT DOCUMENTS

| 3,191,150 | 6/1965 | Andrews . | |
|---|---|---|---|
| 3,509,280 | 4/1970 | Jones . | |
| 3,688,267 | 8/1972 | Iijima et al. . | |
| 3,816,722 | 6/1974 | Sakoe et al. | 381/43 |
| 3,906,446 | 9/1975 | Iijima et al. | 382/36 |
| 4,069,393 | 1/1978 | Martin et al. | 381/43 |
| 4,181,821 | 1/1980 | Pirz et al. . | |
| 4,256,924 | 5/1981 | Sakoe | 381/43 |
| 4,319,221 | 5/1982 | Sakoe | 381/43 |

OTHER PUBLICATIONS

A Real Time Spoken Word Recognition System with Various Learning Capabilities of Speaker Differences, System.Computers.Controls, vol. 9, No. 3, Jun. 1978, Nakagawa.

Primary Examiner—E. S. Matt Kemeny
Attorney, Agent, or Firm—Banner, Birch, McKie & Beckett

[57] ABSTRACT

In a pattern recognition system for speech or print, a first memory stores predetermined reference vectors. A second memory stores subsequently-determined reference vectors subsequent to misrecognition when a new speaker or font is inputted, whereby only the deformations (differences) from a predetermined category of vectors are stored.

11 Claims, 12 Drawing Figures

PATTERN RECOGNITION APPARATUS AND METHOD FOR MAKING SAME

BACKGROUND OF THE INVENTION

This invention relates to an apparatus and method for recognizing input patterns such as voice patterns and character patterns. Pattern recognition is gaining more acceptance as a fundamental technique for inputting information into computer systems. One method called the similarity method or pattern matching method is a well-known pattern recognition process and is widely utilized in the field of character recognition. Several different similarity methods are known, including the simple similarity method, multiple similarity method and mixed similarity method.

The simple similarity method utilizes a single separate reference pattern, for each category, represented by a vector which is stored in a dictionary memory. A single reference pattern corresponding to each designated category represents, for example, a certain character or voice pattern to be identified. That is, one category can consist of the letter (A), another category can consist of lower case letter (a). In voice recognition, separate categories can consist of the respective sounds for pronouncing each of the vowels (a, e, i, o and u). These reference patterns are then compared with the vector representations of the patterns to be identified (i.e., input patterns) to determine its numerical value of similarity. A high value of similarity indicates that the input pattern is identical or nearly identical to the reference pattern. In particular, the simple similarity method can be performed as follows. First, signals representing the input pattern are sampled and these discrete sampled values are stored as vector components of the input signal. This input vector is then compared with the vectors representing each category. A numerical value of similarity is then calculated for each category which indicates the degree of similarity between the input pattern and the reference pattern for each category. Second, the maximum value of similarity is determined from all the calculated values; this value thus identifies the category to which the input patterns belong.

This simple similarity method has an advantage in that the design of the dictionary of reference patterns can be easily automated, and is not greatly affected by such local noise as stain or scratches in the patterns. It is liable to be affected adversely, however, by such overall changes in the patterns which occur in handwritten letters or voice patterns. That is due to the wide variation in handwriting and voice patterns or pronounications, more deformations in the input pattern can occur. Thus, it is impractical to represent each category by a single reference pattern.

Consequently, other methods have been devised to recognize the input pattern in view of such wide deformations. One such method is the multiple similarity method as disclosed in U.S. Pat. No. 3,688,267 and the mixed similarity method as disclosed in U.S. Pat. No. 3,906,446.

According to the multiple similarity method, a plurality of reference pattern vectors are created for each category. The multiple similarity for a certain category is defined as the sum of the square root of the values of simple similarity between the input pattern and every reference pattern in the same category. As in the case of simple similarity discussed above, recognition is carried out as follows. First, signals representing the input pattern are sampled and these discrete sampled values are stored as vector components of the input signal. This input vector is then compared with each reference pattern vector in the same category. A numerical value of similarity is then calculated for each comparison; the square root of these values are then summed to provide a multiple similarity value for each category. Second, the maximum value of similarity is detected from all calculated values; this value thus identifies the category to which the input pattern belongs.

In the case of mixed similarity, the procedures discussed above for multiple similarity are employed. In addition, the similarity values for mutually similar reference patterns are identified and subtracted to provide even more accurate identification.

The above-described multiple similarity and mixed similarity methods are useful to recognize patterns capable of having numerous variations or overall deformations. However, the conventional systems employing such methods require storage of numerous reference patterns to provide sufficient data to accurately identify and recognize various input patterns. In fact, it is very costly and time consuming to compile the necessary data. Not only is an unduly large memory capacity needed, but excessive computer time is required to calculate the numerous matrix calculations needed to analyze and compare the various stored reference pattern data and input patterns. Consequently, preparation and computation of reference patterns stored in a computer memory for achieving complete and accurate recognition of patterns subject to various deformations have been impractical. As a result, many systems have been developed with a limited reference pattern storage to avoid the cost and incident problems discussed above; consequently, misrecognition has frequently occured when input patterns subject to various deformations have been applied. The industry, therefore, has required a system which can easily be adapted and tailored for special and individual needs without developing an unduly large common memory of reference patterns.

SUMMARY OF THE INVENTION

It is therefore an important object of the invention to provide a new and improved pattern recognition apparatus and method.

It is a further object of the invention to provide a new and improved recognition apparatus and method capable of recognizing, with high accuracy, patterns capable of having various deformations.

It is a more specific object of the invention to provide a new and improved pattern recognition apparatus and method with an improved dictionary to thereby provide accurate recognition for patterns which were once misrecognized.

A further object of the present invention is to provide a flexible pattern recognition system which can be easily tailored to many applications without the necessity of constructing a costly and unduly large common memory of reference patterns.

A still further object of the present invention is to accurately identify input patterns capable of various deformations without requiring excessive matrix calculations and computer time.

According to the invention, there is provided a pattern recognition apparatus including a vector generating unit for generating an input vector representing the characteristics of an unknown input pattern, a dictionary unit which stores a plurality of reference vectors for each category, a similarlity calculating unit which calculates a similarity between the input vector and a plurality of reference vectors for each category, a comparing unit which determines the category to which the input pattern belongs by comparing the similarities derived from the similarity calculating unit, and an additional dictionary generating unit which generates additional reference vectors for a particular need or application.

The vector generating unit comprises an input unit for converting the unknown input pattern into electrical signals, and a pre-processing unit receiving the electrical signals and generating the input vector which represents the characteristics of the unknown input pattern.

The dictionary unit has a common dictionary memory for storing common reference vectors previously prepared and an additional dictionary memory for storing additional reference vectors generated by the additional dictionary generating unit.

The similarity calculating unit calculates similarities between the input vector and reference vectors stored in both the common and additional dictionary for each category. The similarity for each category is calculated as follows. First, scalar (inner) products between the input vector and each of the common reference vectors belonging to each category are calculated. The scalar products thus obtained are squared. The squared scalar products are summed to provide a first sum. Second, scalar products between the input vector and each additional reference vector corresponding to each category are calculated. These scalar products are likewise squared. Then these second squared scalar products are summed to provide a second sum. The similarity for each category is obtained by adding the first sum and the second sum for each category.

The additional dictionary generating unit generates an additional reference vector obtained by subtracting the components of at least common reference vectors, in the specified category, from the input vector. The additional reference vector is stored in the storage area within the additional dictionary memory corresponding to a specified category.

Thus, it is possible to satisfy the objective mentioned above. Other objects and features of this invention will be apparent from the following description read in connection with the accompanying drawings.

DETAILED DESCRIPTION OF THE PREFERRED EMBODIMENT

Figure 1:
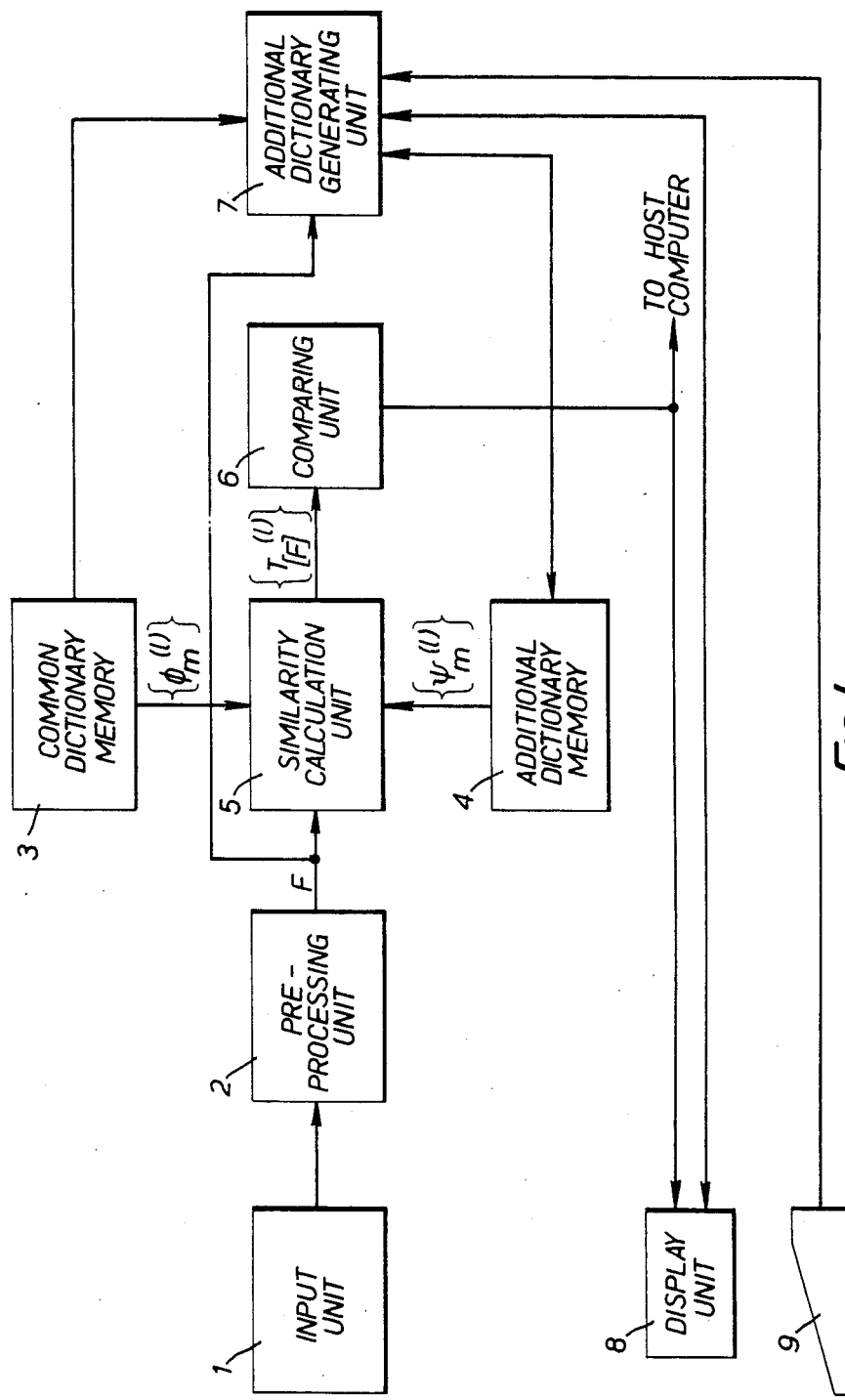
FIG. 1 is a block diagram of the pattern recognition apparatus showing an embodiment of this invention.

FIG. 1 shows the preferred embodiment of the apparatus according to the present invention for recognizing voice patterns. A theoretical explanation will be given with reference to FIG. 1 in order to clarify the features of the invention.

Input unit 1 converts an input voice into electrical signals and is then converted into a pattern vector in a pre-processing unit 2. The input pattern vector (hereinafter indicated by F) represents the characteristics of the input voice signal. The vector F consists of N number of components fi (i=1,2, - - - , N), each component, for example, being a frequency spectrum component of the input voice.

A common dictionary memory 3 stores a plurality of reference vectors for each category which have been previously prepared as reference patterns for permitting multiple or mixed similarity as mentioned above. A category l (l=1,2, - - - L) which is a subject of recognition includes a set of references vectors indicated by $[\phi_m^{(l)}]$ or indicated individually by vectors $\phi_1^{(l)}$, $\phi_2^{(l)}$, - - - , $\phi_{M(l)}^{(l)}$. The value $M^{(l)}$ is the number of reference vectors in the category l. Each reference vector consists of N number of components; that is, the same dimension as input vector F. The vectors in this category should preferably satisfy an orthogonal relation given by the following formula:

$$(\phi_m^{(l)}, \phi_{m'}^{(l)}) = \begin{cases} 1 \ (m = m') \\ 0 \ (m \neq m') \\ \quad (m, m = 1,2, - M^{(l)}) \end{cases}$$

where $(\phi_m^{(l)}, \phi_{m'}^{(l)})$ denotes a scalar (inner) product between vectors $\phi_m^{(l)}$ and $\phi_{m'}^{(l)}$. Based upon this formula, the number of reference vectors required to represent a given category is minimized so that the size of common dictionary memory 3 is reduced.

An additional dictionary memory 4 stores a plurality of additional reference vectors which are generated by an additional dictionary generating unit 7 described later. The set of additional reference vectors for the category l is indicated by $\psi_n^{(l)}$, and each additional reference vector is indicated by $\psi_1^{(l)}$, $\psi_2^{(l)}$, - - - , $\psi_{N(l)}^{(l)}$, where $N^{(l)}$ is a number of additional reference vectors for the category l stored in memory 4. Similar to vector F, each additional reference vector also consists of N number of components.

A similarity calculating unit 5 calculates similarities for individual categories. The calculation of a similarity for one category includes three steps, In the first step, the similarity $S_{[F]}^{(l)}$ between the input vector F and reference vector $\phi_m^{(l)}$ of category l is calculated as follows:

$$S_{[F]}^{(l)} = \sum_{m=1}^{M^{(l)}} \frac{a_m^{(l)} (F, \phi_m^{(l)})^2}{|F|^2} \qquad (1)$$

In this equation, $(F, \phi_m^{(l)})$ denotes a scalar product between vectors $F$ and $\phi_m^{(l)}$, $a_m^{(l)}$ ($m=1,2,\cdots,M^{(l)}$) denotes a coefficient corresponding to the vector $\phi_m^{(l)}$ ($m=1,2,\cdots,M^{(l)}$), and $|F|$ is the absolute value of the input vector $F$ defined as follows:

$$|F|^2 = (F,F)$$

Further, each reference vector $\phi_m^{(l)}$ is normalized so that $|\phi_m^{(l)}| = 1$ in equation (1). According to the conventional multiple or mixed similarity method mentioned above, similarities for all categories obtained by equation (1) are compared with each other to determine the category to which the input pattern belongs.

In the second step, the similarity calculating unit 5 of this invention further calculates the similarity $S'_{[F]}^{(l)}$ between the input vector $F$ and additional reference vectors $\psi_m^{(l)}$ which are generated by an additional dictionary generating unit 7. The similarity $S'_{[F]}^{(l)}$ is calculated as follows:

$$S'_{[F]}^{(l)} = \sum_{n=1}^{N^{(l)}} \frac{b_n^{(l)} (F, \psi_n^{(l)})^2}{|F|^2} \quad (2)$$

In this equation, $b_n^{(l)}(n=1,2,\cdots,N^{(l)})$ denotes a coefficient corresponding to the vector $\psi_n^{(l)}(n=1,2,\cdots,N^{(l)})$, and each additional reference vector $\psi_n^{(l)}$ is normalized so that $|\psi_n^{(l)}| = 1$.

In the third step, unit 5 calculates the summed similiarity $T_{[F]}$ of the input vector $F$ for each category as follows:

$$T_{[F]} = S_{[F]} + S'_{[F]} \quad (3)$$

The similarities $T_{[F]}^{(1)}, T_{[F]}^{(2)}, \cdots, T_{[F]}^{(L)}$ for each category are supplied to a comparing unit 6. Comparing unit 6 detects the maximum value among the L summed similarities $T_{[F]}^{(l)}$ ($l=1,2,\cdots,L$), and determines the category to which the input pattern belongs. Comparing unit 6 produces an output signal representing a name or code of the category. In some cases wherein the maximum similarity is very close to another similarity, comparing unit 6 produces an output reject signal which establishes that the apparatus cannot recognize or identify the input pattern. The output of comparing unit 6 is preferably displayed on a display unit 8 in order to show the result to an operator.

The additional reference vectors $\psi_n^{(l)}$ are generated in additional dictionary unit 7 in the following manner. Assume that the input pattern belongs to the category A, and that this input contains a deformation, for example, a deformation, representing a peculiarity in the operator's pronounciation. Upon being supplied with and an input pattern, similarity calculating unit 5 might produce an output indicating that a similarity $S_{[F]}^{(B)}$ for another category (i.e., incorrect category B) is greater than the similarity $S_{[F]}^{(A)}$ for the correct category A as shown by the following expression:

$$S_{[F]}^{(B)} > S_{[F]}^{(A)}$$

In that situation, the additional dictionary unit 7 is manually or automatically energized and generates an additional vector $\psi_1^{(A)}$ in accordance with the following formula:

$$\psi_1^{(A)} = \frac{F - \sum_{m=1}^{M^{(A)}} (F, \phi_m^{(A)})\phi_m^{(A)}}{\left| F - \sum_{m=1}^{M^{(A)}} (F, \phi_m^{(A)})\phi_m^{(A)} \right|} \quad (4)$$

Equation (4) shows that the additional vector $\psi_1^{(A)}$ is obtained by calculations using input vector $F$, previously recognized as an incorrect category, and reference vectors $[\phi_m^{(A)}]$. The vector thus obtained is stored in the additional dictionary memory 4 as one of the additional vectors belonging to the category A (i.e., correct category). In other words, vector $\psi_1^{(A)}$ represents a vector wherein the particular deformation components of the reference vectors of category A are removed from the input vector $F$. The vector $\psi_1^{(A)}$ given by the equation (4) satisfies the orthogonal relationship with vectors $[\phi_m^{(A)}]$, and $|\psi_1^{(A)}| = 1$. After storing additional vector $\psi_1^{(A)}$ into the additional dictionary memory 4, the similarity calculating unit 5 calculates the similarity $T_{(F)}^{(A)}$ for category A in accordance with equation (3). The similarity $T_{(F)}^{(A)}$ is now found to be greater than $S_{(F)}^{(A)}$ to the extent calculated from equation (1) by the amount $$\frac{b_1^{(A)}(F, \psi_1^{(A)})^2}{|F|^2}$$

Therefore, it is possible to make the similarity $T_{(F)}^{(A)}$ for category A greater than the similarity $T_{(F)}$ for the category B by giving coefficient $b_1^{(A)}$ an appropriate positive value. Thus, input patterns including particular deformations can be correctly recognized and proper categories identified by storing the additional vectors into the proper categories of additional dictionary memory 4.

It is also possible, if desired, to store an additional vector $\psi_1^{(B)}$ into category B instead of category A. In this case, the additional dictionary generating unit 7 generates the vector $\psi_1^{(B)}$ as follows:

$$\psi_1^{(B)} = \frac{F - \sum_{m=1}^{M^{(B)}} (F, \phi_m^{(B)})\phi_m^{(B)}}{\left| F - \sum_{m=1}^{M^{(B)}} (F, \phi_m^{(B)})\phi_m^{(B)} \right|} \quad (5)$$

Vector $\psi_1^{(B)}$ is stored in additional dictionary memory 4 as one of the additional vectors belonging to the category B. Vector $\psi_1^{(B)}$, given by equation (5), also satisfies the orthogonal relationship with vectors $[\phi_m^{(B)}]$, and $|\psi_1^{(B)}| = 1$.

After the storage of vector $\psi_1^{(B)}$, the similarity for the category B is calculated by the unit 5 in accordance with equation (3). It differs from the similarity which would result without the calculation and storage of $\psi_1^{(B)}$ by the amount $$\frac{b_1^{(B)}(F, \psi_1^{(B)})^2}{|F|^2}$$

Therefore, it is possible to make the similarity $T_{(F)}^{(B)}$ for the category B smaller than the similarity $T_{(F)}^{(A)}$ for the category A by giving coefficient $b_1^{(A)}$ an appropriate negative value. Further, it may also be desirable to generate two vectors $\psi_1^{(A)}$, $\psi_1^{(B)}$ according to equations (4), (5) and store both vectors in the additional dictionary memory 4.

The apparatus, according to FIG. 1, has two different operation modes, mode I and mode L. Mode I performs an identification or recognition process where uknown input patterns are recognized; mode L performs a learning or storing process where additional reference vectors are generated and stored in the additional dictionary memory so that the system can be tailored to special needs or applications.

Figure 2:
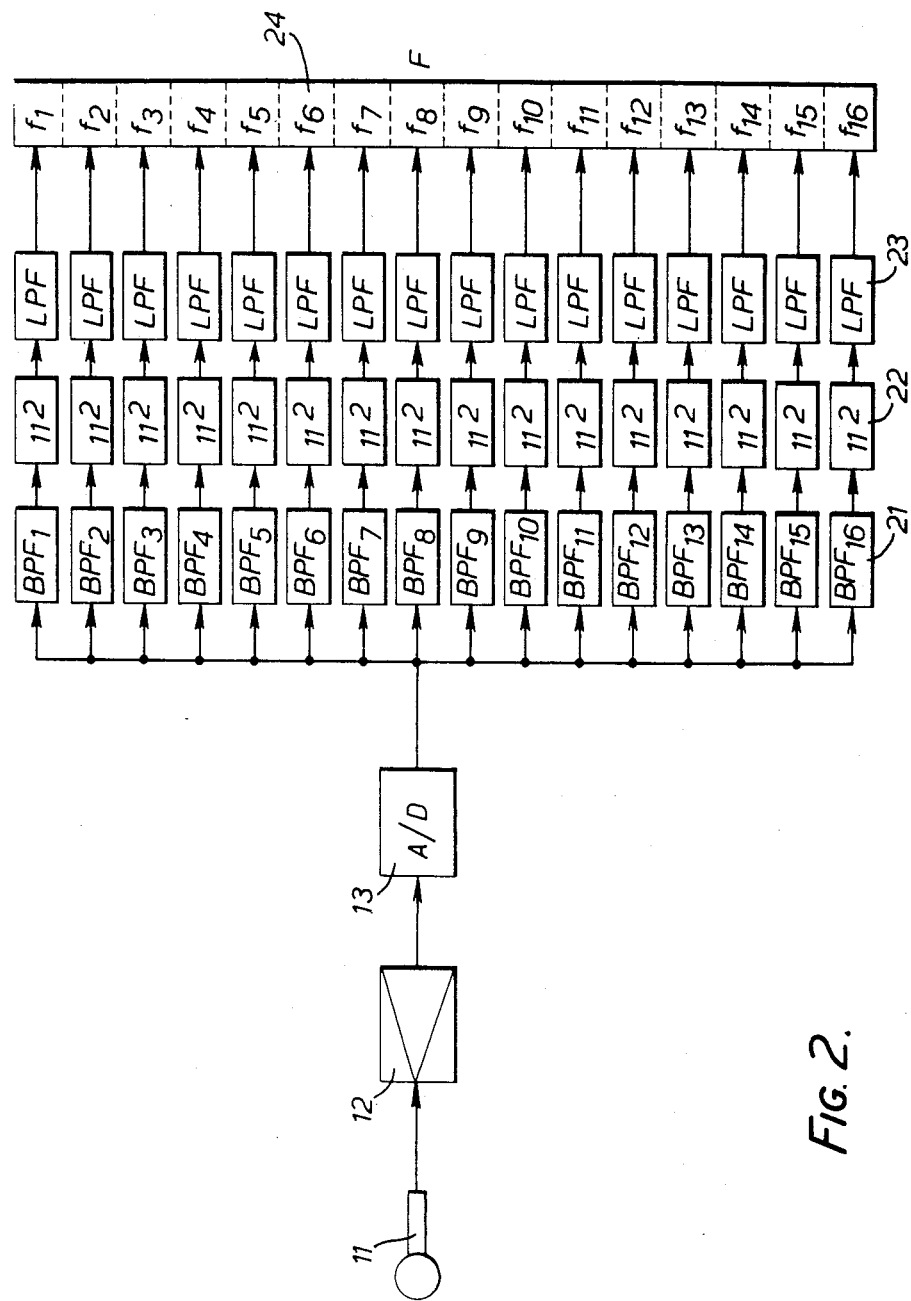
FIG. 2 is a block diagram of the input unit and pre-processing unit of FIG. 1.

FIG. 2 shows the configuration of the input unit 1 and pre-processing unit 2 in FIG. 1. Those elements are similar to the ones disclosed in copending U.S. application Ser. No. 366,667, filed Apr. 8, 1982, now U.S. Pat. No. 4,503,557. A microphone 11 converts the voice signals uttered by the operator into electrical signals. The electrical signals are amplified by the amplifier 12 and supplied to an A/D converter 13. A/D converter 13 converts the electrical signals into digital signals, for example, every 100 usec. The digital signals are supplied to band pass filters ($BPF_1$–$BPF_{16}$), each consisting of well known digital filters and extracting the frequency spectrum components in different frequency ranges. The output of each bandpass filter is supplied to squaring circuits 22. Each squaring circuit squares the output of the corresponding bandpass filter in order to obtain the energy component of the input voice.

The output of each squaring circuit 22 is supplied to low pass filters 23; each low pass filter comprises well known digital filters for obtaining the total energy components corresponding to each frequency range. The output of each low pass filter 23 is stored in an input vector register 24 as respective components $f_n(n=1,2,---,16)$ of input vector F. Thus, input vector F, representing the characteristic of the input pattern, is extracted as a distribution of energies.

Figure 3A:
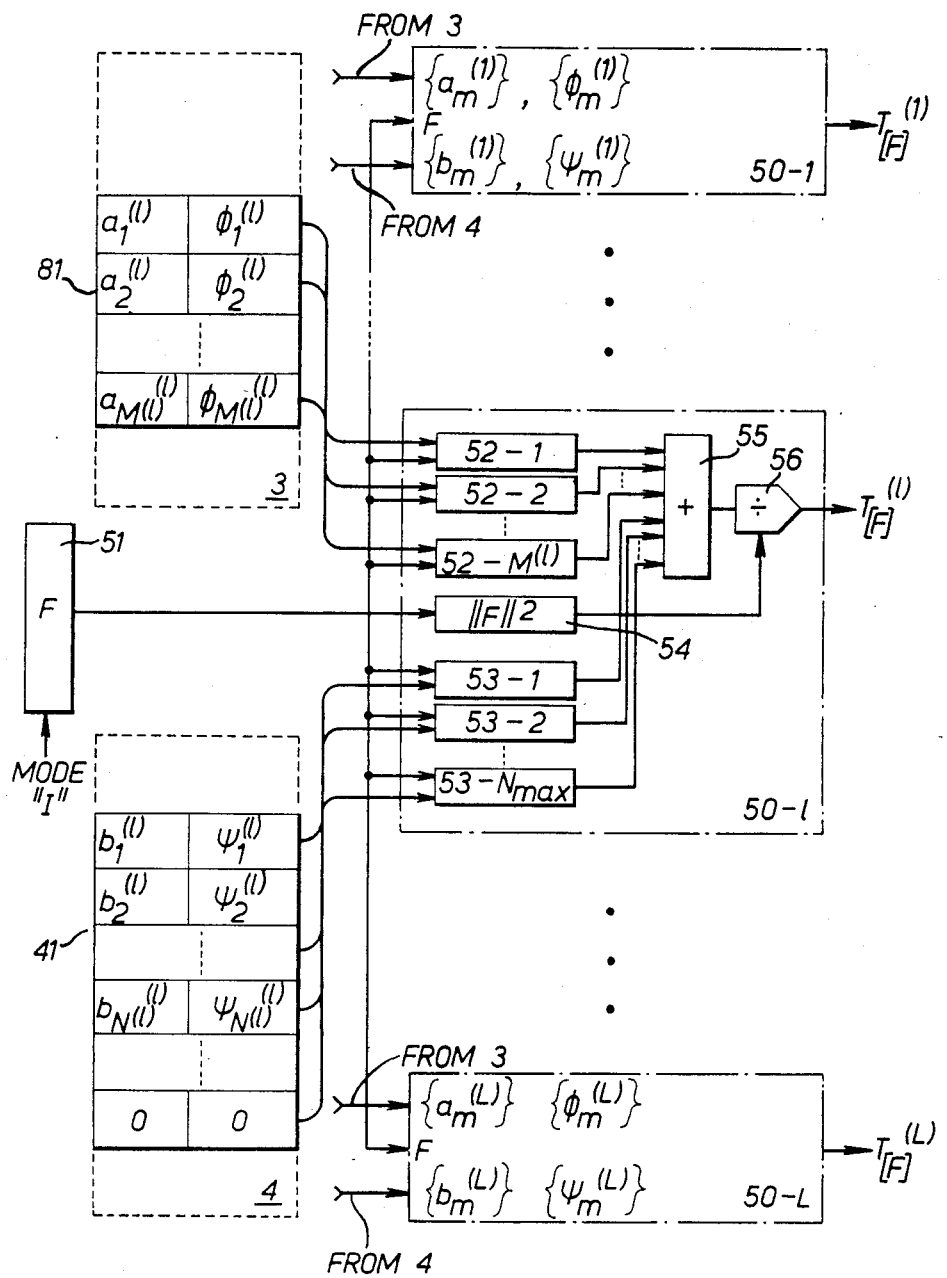
FIG. 3A is a block diagram of the similarity calculating unit of FIG. 1.

FIG. 3A shows the configuration of the similarity calculating unit 5. Shown is L number of similarity calculating circuits 50-1, 50-2, - - -, 50-l, - - -, 50-L, each corresponding to the category 1, 2, - - -, l, - - -, L. Since each circuit consists of the same configuration, only circuit 50-1 is shown in detail in FIG. 3A.

Figure 3B:
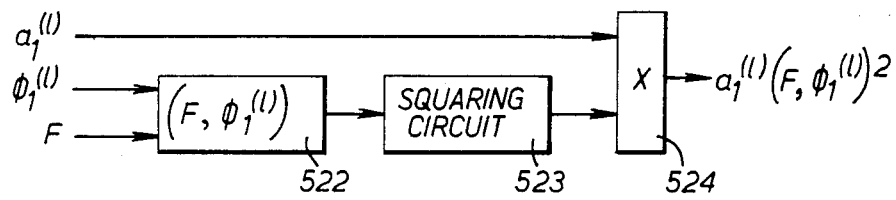
FIG. 3B is a diagram of the calculator 52-1 of FIG. 3A.

When the system is in mode I, the input vector F, stored in register 24, is supplied to a buffer register 51. The content of buffer register 51 is supplied to each circuit 50-1, - - -, 50-L. Also supplied to circuit 50-1 are reference vectors $[\phi_m^{(l)}]$ and coefficients $[a_m^{(l)}]$ which are stored in memory area 31 of the common dictionary memory 3 and corresponding to category l, and additional reference vectors $[\psi_n^{(l)}]$ and coefficients $[b_n^{(l)}]$ which are stored in a memory area 41 of the additional dictionary memory 4 and corresponding to category l. Circuit 50-1 includes $M^{(l)}$ number of calculators 52-1, - - -, 52-$M^{(l)}$, each having the same configuration. Calculator 52-1 is shown in FIG. 3B, as receiving input vector F, reference vector $\phi_1^{(l)}$ and coefficient $a_1^{(l)}$. A scalar product circuit 522 calculates the scalar product between input vector F and the reference vector $\phi_1^{(l)}$. The output of the scalar product circuit 522 is applied to a squaring circuit 523. The squaring circuit 523 squares and output of scalar product circuit 522. The output of squaring circuit 523 is supplied to a multiplier 524 for multiplying this output by the coefficient $a_1^{(l)}$. The output of multiplier 524 is thus $a_1^{(l)}(F,\phi_1^{(l)})$. Other calculators 52-2, - - -, 52-$M^{(l)}$ have the same configuration as calculator 51-1.

Figure 3C:
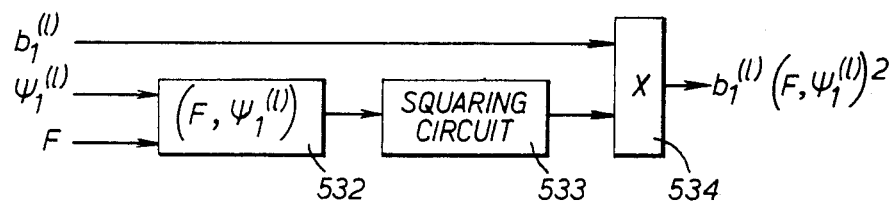
FIG. 3C is a diagram of the calculator 53-1 of FIG. 3A.

Circuit 50-1 also includes Nmax number of calculators 53-1, - - -, 53-Nmax, where Nmax is a maximum number of additional reference vectors capable of being stored in memory area 41. Calculator 53-1 is shown in FIG. 3C, as receiving input vector F, reference vector $\psi_1^{(l)}$ and coefficient $b_1^{(l)}$. A scalar product circuit 532 calculates the scalar product between the input vector F and the reference vector $\psi_1^{(l)}$. The output of the scalar product circuit 532 is supplied to a squaring circuit 533. Squaring circuit 533 squares the output of scalar product circuit 532. The output of squaring circuit 533 is supplied to a multiplier 534 for multiplying this output by the coefficient $b_1^{(l)}$; the output of the multiplier 534 is thus $b_1^{(l)}(F, \psi_1^{(l)})$. Other calculators 53-2, - - -, 53-Nmax have the same configuration as calculator 53-1. The outputs of the calculators 52-1, - - -, 52-$M^{(l)}$ and calculators 53-1, - - -, 53-Nmax are supplied to the adder 55, and their sum is thereby obtained.

The output of adder 55 is $$\sum_{m=1}^{M^{(l)}} a_m^{(l)} (F,\phi_m^{(l)})^2 + \sum_{n=1}^{N^{(l)}} b_n^{(l)}(F,\phi_n^{(l)})^2$$

where $N^{(l)}$ is the number of additional reference vectors stored thus far in the additional memory for the category l. While the memory area 41 of the additional dictionary memory 4 is capable of storing Nmax number of additional reference vectors and coefficients, the residual area of the memory area 41, not being used, stores all zeros.

Figure 3D:
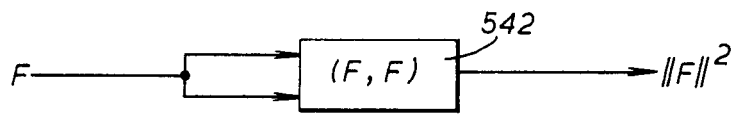
FIG. 3D is a diagram of the absolute value squaring circuit 54 of FIG. 3A.

Circuit 50-1 further includes an absolute value squaring circuit 54 and a divider 56. Absolute value squaring circuit 54 comprises a scalar product circuit 542 as shown in FIG. 3D. The scalar product circuit 542 calculates the scalar product of two inputs; in this case, since the same input vector F is supplied, $|F|^2=(F, F)$. Divider 56 divides the output of the adder 55 by the output of the absolute value squaring circuit 54; as a result, the output of divider 56 is the similarity $T_{(F)}$ for the category and is obtained as follows:

$$T_{(F)}^{(l)} = \frac{\sum_{m=1}^{M^{(l)}} a_m^{(l)}(F,\phi_m^{(l)})^2 + \sum_{n=1}^{N^{(l)}} b_n^{(l)}(F,\phi_n^{(l)})^2}{|F|^2}$$

Thus, circuits 50-1, - - -, 50-L calculate the similarities $T_{(F)}^{(l)}$, - - -, $T_{(F)}^{(L)}$, and supply them to the comparing unit 6.

Figure 4:
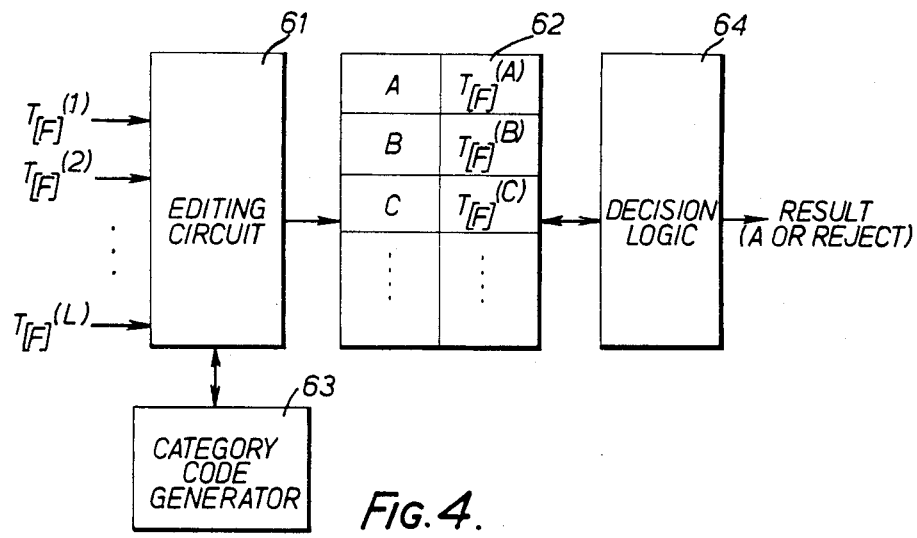
FIG. 4 is a block diagram of the comparing unit of FIG. 1.

The block diagram of comparing unit 6 is shown in FIG. 4. The similarities $T_{(F)}^{(l)}$, - - -, $T_{(F)}^{(L)}$ are supplied to an editing circuit 61. Circuit 61 pairs each calculated similarity with a category name (code) obtained from the category code generator 63, and arranges the pairs in order according to the magnitude of the similarity. Then the ordered pairs are stored in a memory 62. Now, it is assumed that the category code which gives the maximum value $T_{(F)}^{(A)}$ of the similarities is A and that the category code which give the second largest value $T_{(F)}^{(B)}$ of the similarities is B.

A decision logic 64 circuit determines the category to which the input pattern belongs by analyzing the contents of memory 62. For example, predetermined threshold values $\phi_1$ and $\phi_2$ are stored in decision logic circuit 64. Decision logic cicuit 64 receives the maximum value $T_{(F)}^{(A)}$ and the second largest value $T_{(F)}^{(B)}$ from memory 62 and compares $T_{(F)}^{(A)}$ with $\theta_1$. In particular, it determines whether $T_{(F)}^{(A)}$ is larger than the predetermined value $\theta_1$, that is:

$$T_{(F)}^{(A)} > \theta_1 \tag{6a}$$

and also compares whether the difference between $T_{(F)}^{(A)}$ and $T_{(F)}^{(B)}$ is larger than the predetermined value $\theta_2$, that is:

$$T_{(F)}^{(A)} - T_{(F)}^{(B)} > \theta_2 \tag{6b}$$

When the equations (6a), (6b) are satisfied, decision logic circuit 64 determines that the input pattern whose characteristics are represented by the input vector F belong to the category A and outputs the category code A as a recognition result. If one of the equations (6a), (6b) is unsatisfied, decision logic circuit 64 outputs a reject signal indicating that the category cannot be determined.

The outputs of decision logic are supplied to the display unit 8, which comprises a well-known CRT display device and displays the result to the operator. If the operator sees that the input voice pattern is rejected, he can utter the voice pattern again. If the operator finds that the recognition result is incorrect (i.e., the input pattern was misrecognized, or that the particular voice pattern was rejected several times) he will push a mode key (not shown) on keyboard 9. Upon pushing the mode key, the system is set to mode L (Learning mode) in accordance with the following embodiment whereby an additional dictionary generating process is performed.

Figure 5A:
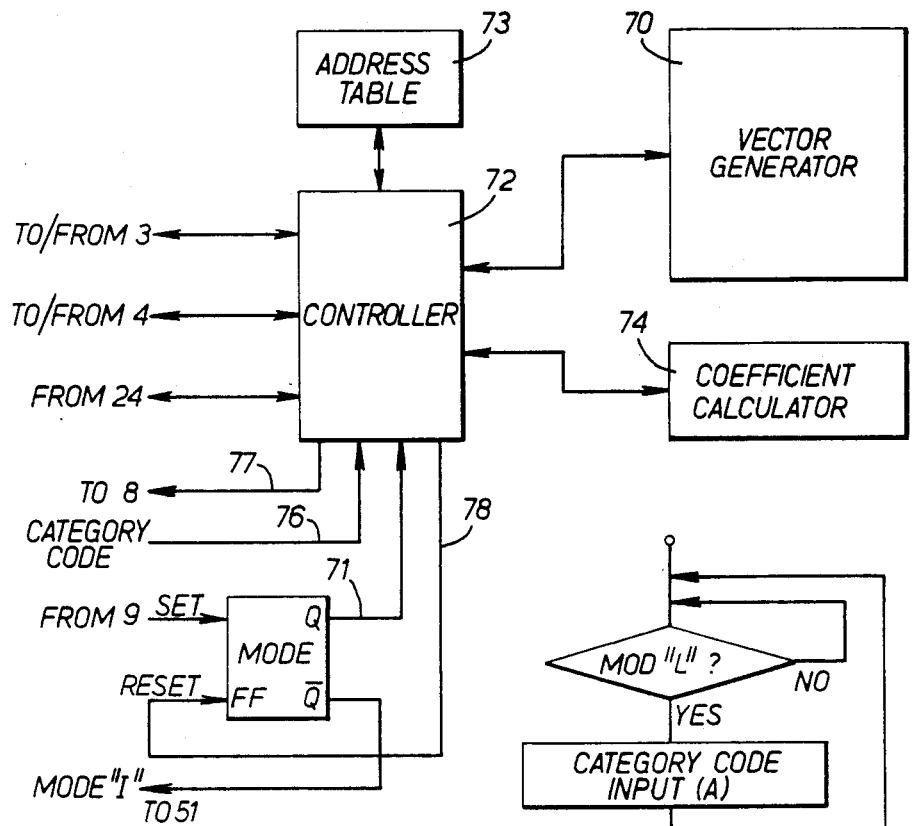
FIG. 5A is a block diagram of the additional dictionary generating unit of FIG. 1.

FIG. 5A shows the configuration of the additional dictionary generating unit 7. As shown, a signal is generated by the keyboard 9 in response to pushing of the mode key. This sets a mode flipflop 71 corresponding to mode L while the rest condition of mode flipflop 71 corresponds to mode I. Unit 7 includes a controller 72 comprising, for example, a micro-computer. Controller 72 operates according to the flow chart shown in FIG. 5B. Controller 72 checks mode flipflop 71 to determine whether it is in a set or reset condition. When the mode flipflop 71 is in the reset condition (mode I), controller 72 repeats the checking process. If controller 72 detects that mode flipflip 71 is in the set condition (mode L), it executes an additional dictionary generating process as outlined in FIGS. 5A and 5B.

During the first step, the operator inputs from keyboard 9 a category code for the additional reference vector he desires to store. Preferably, a message indicating that a category code is needed is sent to the display unit 8 via line 77. Responding to the message command displayed on unit 8, the operator inputs the desired category code. According to the key operation by the operator, keyboard 9 supplies the selected category code (hereinafter designated as A) to controller 72 via line 76.

During the second step, controller 72 by referring to an address table memory 73 fetches the necessary data and supplies it to a vector generator 70 and coefficient calculator 74. Address table memory 73 stores an address table whose data format is shown below:

| p | AD1 | $M^{(l)}$ | AD2 | $N^{(l)}$ | wherein, field l: category code (name) l.
field AD1: start address of the memory area 31 in the common dictionary memory 3 corresponding to the category.
field $M^{(l)}$: the number of reference vectors $\phi_m^{(l)}$ for the category l.
field AD2: start address of the memory area 41 in the additional dictionary memory 4 corresponding to the category l.
field $N^{(l)}$: the number of additional reference vectors $n^{(l)}$ for the category l previously stored.

Controller 72 searches address table memory 73 and obtains each field corresponding to category code A. Controller 72 fetches data within the memory area of the common dictionary memory 3 designated by the field AD1, including reference vectors $\phi_m^{(l)}$, and coefficients $a_m^{(l)}$. It also fetches data within the memory area of the additional dictionary memory designated by the field AD2, including additional reference vectors $\psi_n^{(l)}$ and coefficients $b_m^{(l)}$. It also fetches the input vector F from register 24. Then, controller 72 supplies input vector F, reference vectors $\phi_m^{(l)}$, and additional reference vectors $\psi_n^{(l)}$ to vector generator 70, while supplying the coefficents $a_m^{(l)}$, $b_n^{(l)}$ to the coefficient calculator 74.

During the third step, vector generator 70 generates a new additional reference vector $\psi_x^{(A)}$ and calculator 74 generates a coefficient $b_x^{(A)}$. FIG. 5C shows the configuration of the vector generator 70. Register 701 stores the input vector F supplied by controller 72. Register 702-1, - - -, 702-M' store the reference vectors $\phi_m^{(A)}$ and additional reference vectors $\psi_n^{(A)}$ supplied by controller 72. The number M' of the registers 702-1, - - -, 702-M' is selected as follows:

$$M' = M_{max} + N_{max} - 1$$

where $M_{max}$ is the maximum value among $M^{(l)}$ (l=1,2, - - - ,L), and $N_{max}$ is the number of additional reference vectors which can be stored in the additional dictionary memory 4. Since the number of reference vectors $\phi_m^{(A)}$ and additional reference vectors $\psi_n^{(A)}$ fetched by controller 72 is $M^{(A)} + N^{(A)}$, and $M^{(A)} + N^{(A)} < M'$, controller 72 supplies not only the reference vectors and additional reference vectors to the $M^{(A)} + N^{(A)}$ number of registers but also "0" to the residual registers. Vector generator 70 also includes scalar product circuits 703-1, - - -, 703-M' (FIG. 5C). Each scalar product circuit calculates a scalar product between the input vector F in register 701 and corresponding reference vectors and additional reference vectors. There is also provided discrete groups of multiplier circuits 704-1, - - -, 704-M', each corresponding to respective scalar product circuits 703-1, - - -, 703-M'. Each multiplier group consists of the number of multipliers equaling the number of components of the vector. For example, multiplier 704-1 consists of 16 multipliers, each multiplying the output of the scalar product circuit 703-1 by a respective component of the reference vector $\phi_1^{(A)}$ in register 702-1.

The outputs of the multiplier groups 704-1, - - -, 704-M are supplied to a group of adder circuits group 705, consisting of 16 discrete adder circuits. Each adder of adder group 705 calculates the sum of M' inputs which are the multiplied output of multiplier groups 704 and the same component order of the vectors. For example, the first adder circuit adds the first multiplied component of multiplier 704-1, the first multiplied component of multiplier 704-2 etc. The output of adder group 705 is indicated by a vector D and is given by:

$$D = \sum_{m=1}^{M^{(A)}} (F, \phi_m^{(A)}) \phi_m^{(A)} + \sum_{n=1}^{N^{(A)}} (F, \phi_n^{(A)}) \psi_n^{(A)} \quad (7)$$

As can be seen from equation (7), vector D has components corresponding to the angles between input vector F and each of the reference vectors. For example, as known from vector mathematics $(F, \phi_m^{(A)}) = |F| \; |\phi_m| \cos \theta$ where $\theta$ is the angle between F and $\phi_m^{(A)}$.

A subtractor group 706 subtracts vector D from the input vector F in register 701. The output of subtractor group 706 is supplied to an absolute value circuit 707 and a divider circuit group 708. The absolute value circuit 707 comprises an absolute value squaring circuit. Thus, circuit can comprise a scalar product circuit, such as the circuit shown in FIG. 3D, and a square root circuit for calculating the square root of the output of the scalar product circuit. The divider circuit group 708 divides the output of the subtractor circuit group 706 by the output of the absolute value circuit 707, and the result is supplied to a register 709. The content of register 709 is the additional vector $\psi_x^{(A)}$, which is given by:

$$x(A) = \frac{F - D}{|F - D|} \quad (8)$$

This additional vector $\psi_x^{(A)}$ generated by vector generator 70 satisfies an orthogonal relationship not only with reference vectors $\phi_m^{(A)}$ but also with additional vectors $\psi_n^{(A)}$ previously stored in additional dictionary memory 4. Equation (4) shown above, is obtained by substituting $N^{(A)} = 0$ in equations (7), (8).

The coefficient calculator 74 detects the maximum value $C_{max}$ and the minimum value $C_{min}$ from the coefficients $a_m^{(A)}$, $b_n^{(A)}$ supplied by controller 72, and determines the coefficient $b_x^{(A)}$ as follows:

$$b_x^{(A)} = \frac{C_{max} + C_{min}}{2}$$

During the fourth step, controller 72 receives vector $\psi_x^{(A)}$ from vector generator 70 and writes it into the memory area in the additional dictionary memory 4 corresponding to category A as an additional reference vector $\psi_{N(A)+1}^{(A)}$. Controller 72 also receives coefficient $b_x^{(B)}$ from the coefficient calculator 74 and writes it into the memory area in the additional dictionary memory 4 corresponding to category A as coefficient $b_{N(A)+1}^{(A)}$. During the last step, controller 72 increments the content of the field $N^{(A)}$ of address table memory 73 corresponding to category A, and supplies a reset signal to the mode flipflop 71 via line 78, so that the mode condition returns to mode I (see FIG. 5B).

Many scalar product circuits are utilized in this embodiment. It is noted, in general, that the scalar product between a vector P and a vector Q is calculated as follows:

$$(P, Q) = \sum_{i=1}^{I} p_i q_i$$

where $p_i(i=1,2, ---, I)$ are components of the vector P, and $q_i (i=1,2, ---, I)$ are components of the vector Q.

Therefore, a scalar product circuit can be constructed by utilizing a multiplier and an adder (or accumulator).

Figure 6:
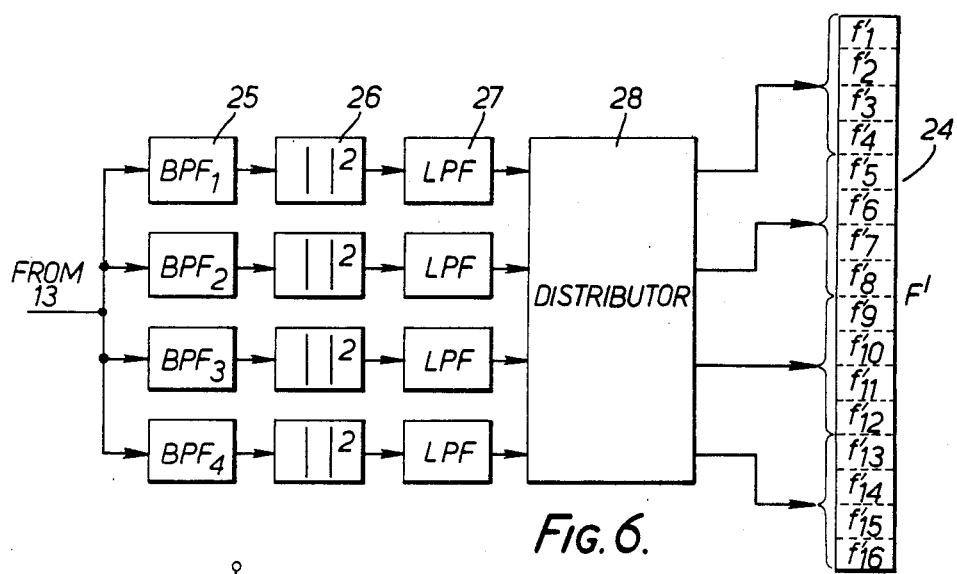
FIG. 6 is another embodiment of a pre-processing unit of FIG. 1.

FIG. 6 shows another embodiment of the pre-processing unit 2. Provided are band pass filters 25 similar to those shown in FIG. 2; however, only four band pass filters 25 are utilized. As a result, the frequency range is selected to be four times broader than the bandpass filters 21 shown in FIG. 2. The output of each bandpass filter 25 is supplied to a corresponding squaring circuit 26 and a lowpass filter 27. The outputs of lowpass filters 27 are distributed into a register 24 by a distributor 28 at intervals of, for example, 10 msec. The input vector stored in register 24 is indicated by F' whose components are F'(i=1,2, ---,16). Components $f'_1, ---, f'_4$ represent an energy distribution of the first time interval, $f'_5, ---, f'_8$ represent an energy distribution of the second time interval, and so on. The type of input vector obtained by the current shown in FIG. 2 is effective for the recognition of the voice patterns such as vowel patterns, while the type of input vector obtained by the circuit shown in FIG. 6 is effective for the recognition of consonant patterns or word patterns.

In recognizing character patterns, hand-written or printed on paper, a photo-electric converter such as a CCD scanner can be utilized as the input unit. Such a scanner scans the character patterns and provides electrical signals representing the darkness of each picture elements, so that the components of the input vector corresponds to the darkness of each picture element of a character pattern, for example, as shown in the aforementioned U.S. Pat. No. 3,906,446.

Although each additional vector generated by vector generator 70 is stored in the additional dictionary memory 40 for the above embodiment, this is not always necessary to practice this invention. The additional dictionary generating unit 7 can be modified as discussed below. In particular, a vector memory can be connected to the controller 72 (not shown in FIG. 5A) for storing the generated additional vectors, the coefficients and the number of generated vectors for each category denoted by $R^{(A)}$ for the category A. The flow chart for controller 72 for operation of this modified system is shown in FIG. 7.

Figure 5B:
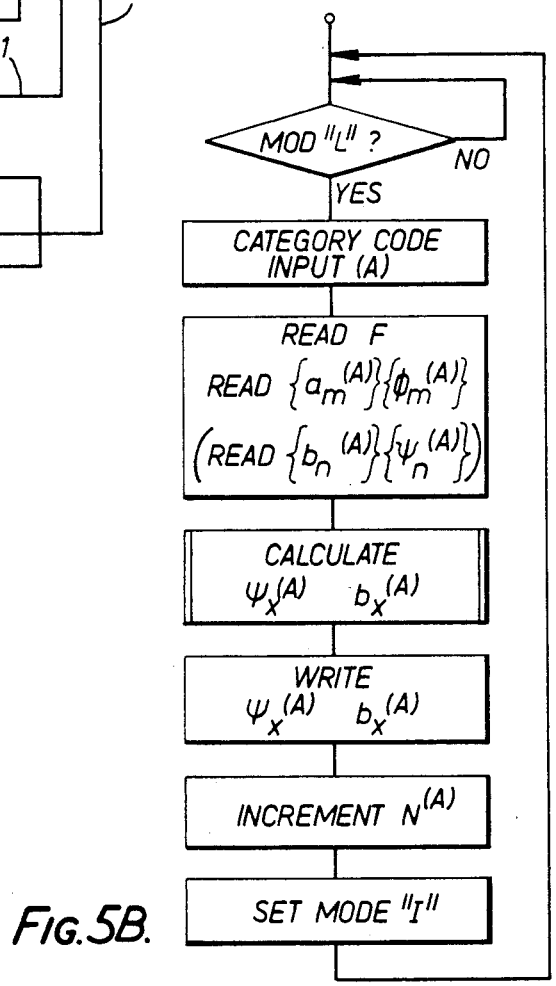
FIG. 5B is a flow chart showing the operation of the additional dictionary generating unit of FIG. 5A.
Figure 5C:
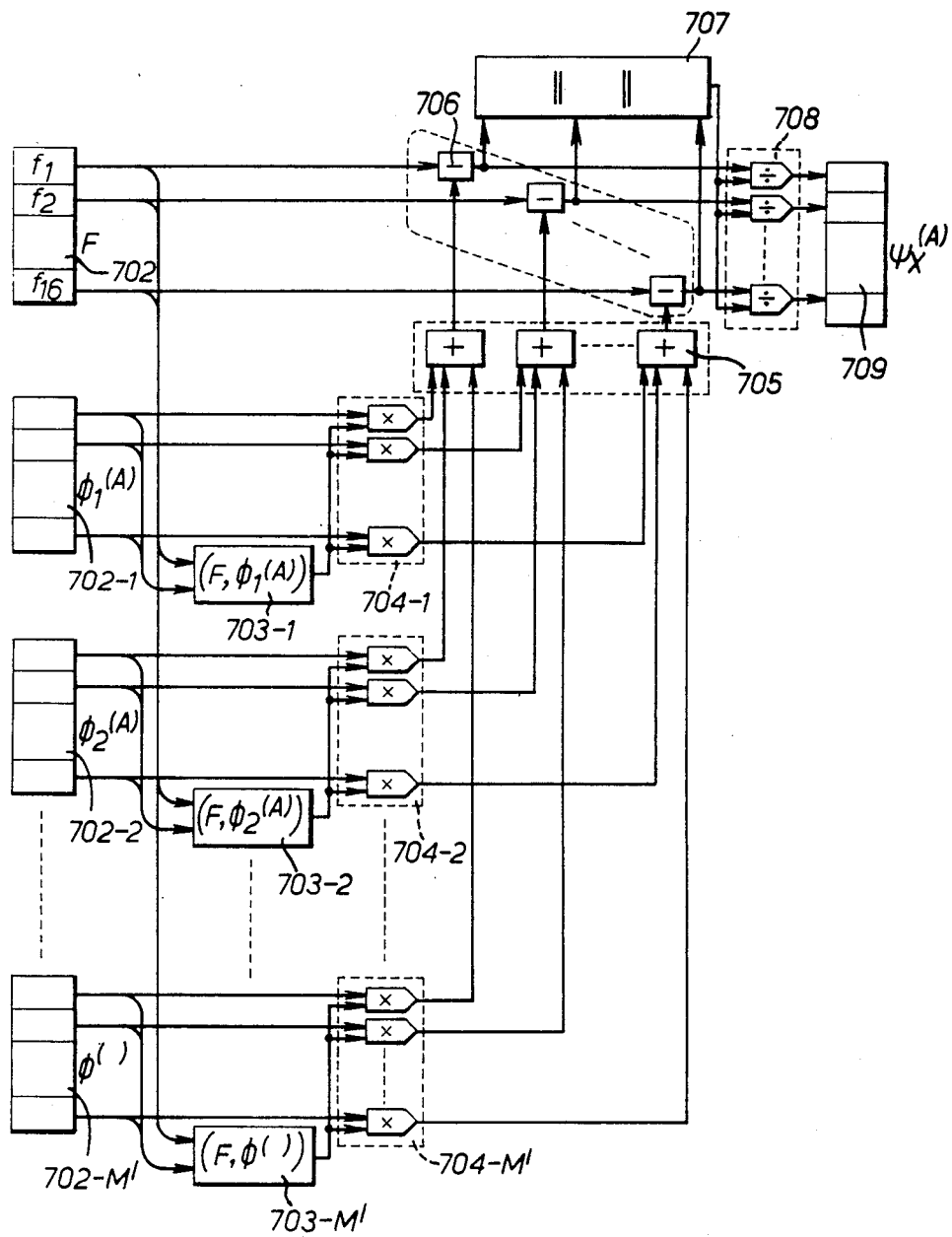
FIG. 5C is a block diagram of the vector generator 70 of FIG. 5A.
Figure 7:
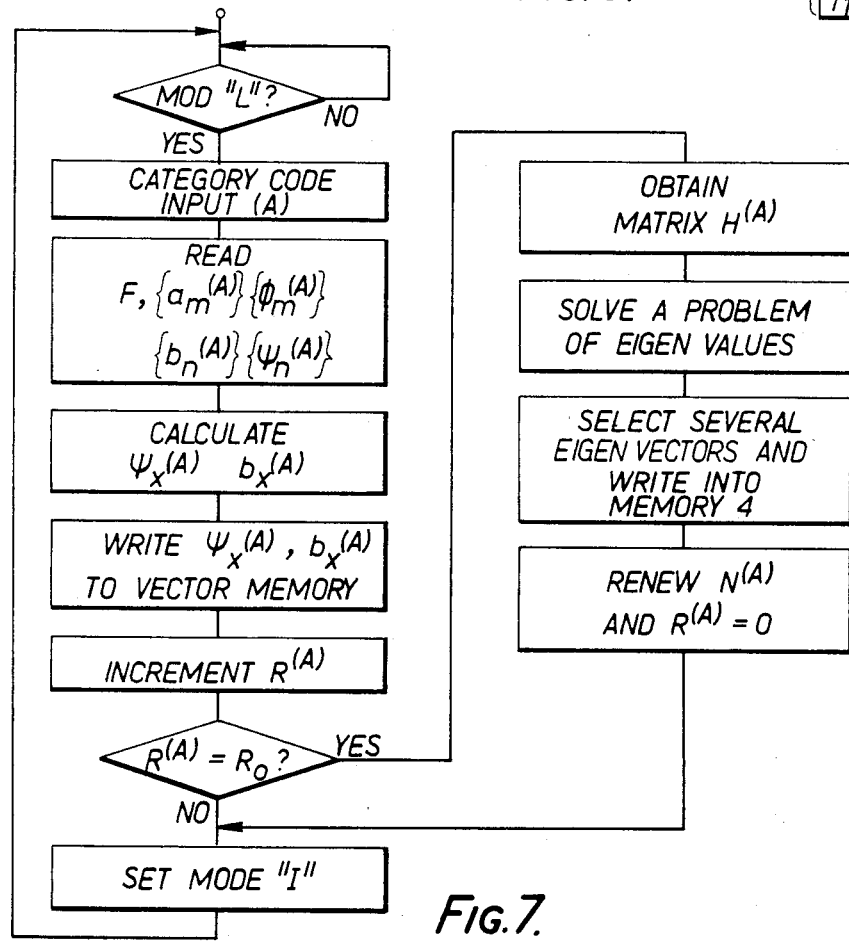
FIG. 7 is a flow chart showing another operation of the additional dictionary generating unit of FIG. 5A.

The first, second and third steps shown in FIG. 7 are similar to the steps shown in FIG. 5B. During the fourth step in FIG. 7, however, the additional vector $\psi_x^{(A)}$ and the coefficient $b_x^{(A)}$ are stored in the vector memory, and the number $R^{(A)}$ is incremented by one. During the fifth step, $R^{(A)}$ is compared with a predetermined value $R_0$. If $R^{(A)} \neq R_0$, the mode condition is changed to mode I without storing additional vectors. If the condition $R^{(A)} = R_0$ is satisfied, controller 72 processes as follows.

During the sixth step, vectors $\psi x_r^{(A)} (r=1,2, ---, R_0)$ in the vector memory as substituted into the following equation and correlation matrix H is obtained:

$$H^{(A)} = \sum_{r=1}^{R_o} w_r^{(A)} <\psi x_r^{(A)}, \psi x_r^{(A)}> \quad (9)$$

where $w_r^{(A)}$ are weighting factors, and $<,>$ denotes the operation of dyad. During the seventh step, eigenvalues are obtained for the correlation matrix as follows:

$$\mu_n^{(A)} \psi_n^{(A)} = H^{(A)} \psi_n^{(A)} \quad (10)$$

Eigenvectors are then obtained corresponding to the eigenvalues. In the eighth step, several of the eigenvectors which have the largest eigenvalues are selected and stored in the additional dictionary 4 as additional reference vectors. During the ninth step, $N^{(A)}$ of the address table 73 is added to the number of selected eigenvectors. The vectors $\psi x_r^{(A)}$ are cleared from the vector memory and $R^{(A)}$ is set to zero. The number of additional vectors to be stored is generally selected so that it is smaller than the number of deformed patterns which were misrecognized or rejected.

Further, the steps of storing coefficients in the dictionary memory is not necessary when, for example, the following reference vectors are used:

$$\phi'^{(l)}_n = \sqrt{a_m^{(l)}} \cdot \phi_m^{(l)}$$

$$\psi'^{(l)}_n = \sqrt{b_n^{(l)}} \cdot \psi_n^{(l)}$$

The above described arrangement is merely illustrative of the principles of the present invention. Numerous modifications and adaptations thereof will be readily apparent to those skilled in the art without departing from the spirit and scope of the present invention.

What is claimed is:

1. A pattern recognition apparatus for identifying the category of an input pattern from various categories of value patterns stored in the apparatus comprising:

a vector generating means for converting an input pattern signal to an input vector representing the characteristics of the input pattern;

a dictionary means for storing a plurality of reference vectors for each of said various categories, including a first memory means for storing a plurality of predetermined first reference vectors for each of said categories, said first reference vectors representative of features common to said categories, and a second memory means for storing a plurality of subsequently determined second reference vectors for each of said categories, said second reference vectors representative of features particular to said categories, said second reference vectors being mutually exclusive of said first reference vectors;

a reference vector generating means for generating said second reference vectors from the input vector and for storing them in said second memory means, said reference vector generating means generating said second reference vectors by subtracting from the input vector a vector having components corresponding to the angles between the input vector and each of said first reference vectors;

a similarity calculating means for calculating the similarities between said input vector and reference vectors stored in said dictionary means for each of said categories; and a comparing means for comparing the similarities calculated for each of said categories and for identifying the category of the input pattern.

2. A pattern recognition apparatus of claim 1 wherein the similarity calculating means comprises:

a scalar product calculating means for calculating the scalar product between the input vector and each of said reference vectors;

squaring means for squaring each output of said scalar product calculating means; and adding means for adding each of said squared outputs.

3. A pattern recognition apparatus of claim 2 wherein said first and second memory means store coefficients corresponding to each of said reference vectors, said similarity calculating means further comprising a multiplying means for multiplying the output of said squaring means by the corresponding coefficient, and said reference vector generating means further comprising a coefficient calculating means for calculating the coefficient corresponding to the generated second reference vector from the coefficients of the first reference vectors.

4. A pattern recognition apparatus according to claim 1 or 2 in which said vector generating means includes an input means for converting said input pattern into electrical signals, and a pre-processing means, receiving said electrical signals, for extracting said input vector representing the characteristic of the input pattern from said electrical signals.

5. A pattern recognition apparatus according to claim 4 wherein said input pattern is a voice pattern, and said input means comprises a microphone.

6. A pattern recognition apparatus according to claim 4 wherein said pre-processing means comprises: a plurality of band-pass filters, each filter having a different frequency range; a plurality of squaring circuits, each coupled to a corresponding bandpass filter; and a plurality of low pass filters, each coupled to a corresponding squaring circuit.

7. A pattern recognition apparatus according to claim 2 wherein said similarity calculating means further comprises an absolute value squaring means for obtaining the squared absolute value of the input vector, and a dividing means for dividing the output of said adding means by the output of the absolute value squaring means.

8. A pattern recognition apparatus according to claim 1 or 2 wherein said comparing means comprises: a detecting means for determining the maximum value of said calculated similarities and the second largest value of said calculated similarities; a first comparing means for comparing said maximum value with a predetermined first threshold value; and, a second comparing means for comparing the difference between said maximum value and said second largest value with a predetermined second threshold value.

9. A pattern recognition apparatus according to claim 1 or 2 wherein said reference vector generating means includes a category designating means for designating the desired category for the generated second reference vectors and a reference vector calculating means for calculating and generating said second reference vectors for the category A according to the following equation:

$$\psi_x^{(A)} = \frac{F - \sum_{m=1}^{M^{(A)}} (F, \phi_m^{(A)})\phi_m^{(A)} - \sum_{n=1}^{N^{(A)}} (F, \psi_n^{(A)})\psi_n^{(A)}}{\left| F - \sum_{m=1}^{M^{(A)}} (F, \phi_m^{(A)})\phi_m^{(A)} - \sum_{n=1}^{N^{(A)}} (F, \psi_n^{(A)})\psi_n^{(A)} \right|}$$

wherein $\psi_x^{(A)}$ is the second reference vectors to be generated, F is the input vector, $\phi_m^{(A)}(m=1,---,M^{(A)})$ are the first reference vectors of category A wherein category A is designated by the designating means, $M^{(A)}$ is a number of first reference vectors of category A, $\psi_n^{(A)}(n=1,---,N^{(A)})$ are the second reference vectors of category A previously stored in the second memory means, $N^{(A)}$ is a number of second reference vectors of category A previously stored, (F, $\phi_m^{(A)}$) denotes the calculation of a scalar product between vector F and vector $\phi_m^{(A)}$.

10. A pattern recognition apparatus for identifying the category of an input pattern from various categories of reference patterns stored in the apparatus, comprising:
- a vector generating means for converting an input pattern signal to an input vector representing the characteristics of the input pattern;
- a dictionary means for storing a plurality of reference vectors for each of said various categories, including a first memory means for storing a plurality of predetermined first reference vectors for each of said categories, said first reference vectors representative of features common to said categories, and a second memory means for storing a plurality of subsequently determined second reference vectors for each of said categories, said second reference vectors representative of features particular to said categories, said second reference vectors being mutually exclusive of said first reference vectors;
- a reference vector generating means for generating said second reference vectors from the input vector and said first reference vectors and for storing them in said second memory means, said second reference vectors representing characteristics which are specific to said input pattern;
- a similarity calculating means for calculating the similarities between said input vector supplied from the vector generating means and reference vectors stored in said dictionary means for each of said categories, said similarity calculating means comprising a scalar product calculating means for calculating the scalar product between the input vector and each of said reference vectors, a squaring means for squaring each output of said scalar product calculating means, and an adding means for adding each of said squared outputs; and
- a comparing means for comparing the similarities calculated for each of said categories and for identifying the category of the input pattern.

11. In a pattern recognition system for identifying the category of an input pattern from various categories of reference patterns stored in the system including means for generating an input vector representing the characteristics of the input pattern to be identified, a dictionary means for storing sets of reference vectors each set representing the characteristics of a particular category of reference patterns, a similarity calculating means for determining the similarities for every category by calculating the squared scalar products between the input vector and each set of reference vectors, a comparing means for comparing the category to which the input pattern belongs by comparing said calculated similarities and a reference vector generating means for generating an additional reference vector which is added to the set of reference vectors previously stored, the system having a recognizing mode wherein an unknown input pattern is identified and a learning mode wherein the reference vector generating means is energized, the method of generating said additional reference vector during the learning mode comprising the steps of:
- supplying said input vector to the reference vector generating means;
- specifying the category to which the additional reference vector belongs;
- transferring the sets of reference vectors of the specified category from the dictionary means to the vector generating means;
- obtaining said additional reference vector by removing components of the transferred reference vectors from the supplied input vector; and
- storing the additional reference vector in the dictionary means as one of the reference vectors of the specified category.

* * * * *